United States Patent [19]
Huang

[11] Patent Number: 5,409,286
[45] Date of Patent: Apr. 25, 1995

[54] PROTECTIVE COVER FOR AUTOMOBILE

[76] Inventor: Robert I. Huang, 35984 Caxton Pl., Fremont, Calif. 94536

[21] Appl. No.: 167,571

[22] Filed: Dec. 14, 1993

[51] Int. Cl.[6] .............................................. B60J 11/00
[52] U.S. Cl. .................................... 296/136; 296/95.1;
160/370.21; 24/265 H; 150/166
[58] Field of Search ....................... 296/95.1, 136;
160/370.2 R, 370.2 A, 370.2 B, 327–329;
24/301, 302, 370, 265 H; 150/166, 168

[56] References Cited

U.S. PATENT DOCUMENTS

| | | | |
|---|---|---|---|
| 1,470,454 | 10/1923 | Landeweer et al. | 160/243 X |
| 2,751,977 | 6/1956 | Pinkerton | 296/95.1 |
| 2,874,709 | 2/1959 | Cohen et al. | 296/95.1 |
| 3,992,053 | 11/1976 | Hrytzak et al. | 296/136 |
| 4,216,989 | 8/1980 | Tackett | 296/136 |
| 4,596,418 | 6/1986 | Koh | 296/136 |
| 4,657,298 | 4/1987 | Yong O | 296/136 |
| 4,718,711 | 1/1988 | Rabbit | 296/136 |
| 4,732,421 | 3/1988 | Ross et al. | 296/136 |
| 4,799,728 | 1/1989 | Akers et al. | 296/136 |
| 4,825,889 | 5/1989 | Monteith | 296/136 X |
| 4,842,324 | 6/1989 | Carden | 296/136 |
| 4,848,823 | 7/1989 | Flohr et al. | 296/98 |
| 4,867,216 | 9/1989 | McKee | 150/166 |
| 4,889,171 | 12/1989 | Minimo | 296/95.1 |
| 4,948,191 | 8/1990 | Cao | 296/95.1 |
| 4,958,881 | 9/1990 | Piros | 296/98 |
| 4,966,406 | 10/1990 | Karasik et al. | 296/98 |
| 4,972,892 | 9/1990 | Yeh | 150/166 |
| 4,998,495 | 3/1991 | Bos et al. | 114/219 X |
| 5,014,758 | 5/1991 | Stinson | 150/168 |
| 5,029,933 | 7/1991 | Gillem | 296/136 |
| 5,056,839 | 10/1991 | Yoon | 293/117 |
| 5,078,330 | 1/1992 | Hall | 242/86.52 |
| 5,088,788 | 2/1992 | Moulton | 296/136 |
| 5,188,417 | 2/1993 | Curchod | 296/136 |
| 5,294,167 | 3/1994 | Yu | 296/136 X |

FOREIGN PATENT DOCUMENTS

| | | | |
|---|---|---|---|
| 1906498 | 2/1969 | Germany | 296/136 |
| 23706 | 8/1979 | Japan | 296/136 |
| 0131422 | 10/1981 | Japan | 296/95.1 |

Primary Examiner—Dennis H. Pedder

[57] ABSTRACT

A protective cover apparatus for an automobile (30) includes a cover (11) covering-passenger compartment (32) of the automobile (30), a semi-pliable metal hook (17) linked to a handhold (13) on the cover (11) by a cord (16) for securing the cover (11) to the front of the automobile (30), a storage pouch (18) for storing the the cover (11) and an adjustable belt (19) fixed to the storage pouch (18) for securing the pouch (18) and the cover (11) to the trunk (34) of the automobile (30). In a second arrangement, the front end of the cover (11) is secured to the windshield (35) by suction pads (55) under the handhold (13). The storage pouch (18) is replaced by a pair of tie-down straps (50) and a roll-up sheet (51). The tie-down straps (50) tie the folded cover (11) to the roll-up sheet (51) before the roll-up sheet (51) wraps up the cover (11) for storage. Both arrangements are similiar in operation but have different advantages in manufacturing. The first arrangement is capable of fitting automobiles (30) of different sizes or styles with one single size while the second arrangement requires specific sizing to fit.

4 Claims, 7 Drawing Sheets

PROTECTIVE COVER FOR AUTOMOBILE

BACKGROUND

1. Field of Invention

This invention relates to weather protective covers for automobiles and the like.

2. Description of Prior Art

Automobile covers have been utilized to protect automobiles from dust, bird droppings and adverse weather conditions when the automobiles are parked outdoors. To apply a conventional cover to or to collect the cover from an automobile can be an effort-taking and time-consuming task for motorists. However, under many circumstances, motorists perceive a need for some convenient form of temporary protection of their automobiles.

Many forms of improvement are disclosed in the prior art. In U.S. Pat. Nos. 4,657,298, 4,732,421, 4,848,823, 4,958,881, 5,056,839 and 5,078,330, covers equipped with manual or power winding mechanisms are claimed to make the use of the covers an easy matter. In fact, complexity and high costs of manufacturing such covers make them difficult to be successfully commercialized.

Covers disclosed in U.S. Pat. Nos. 4,216,989, 4,799,728, 4,842,324, 4,867,216, 4,972,892 and 5,014,758 covering passenger compartment of the automobile which includes windshield, side windows, rear window and roof require specific sizing to fit and, in many cases, do not really simplify the use of the covers to a convenient level.

Canopy style prior art covers, such as those detailed in U.S. Pat. No. 3,992,053 and 4,718,711, do not provide sufficient protection to the automobiles. Covers having storage housing attached to the automobile body, such as disclosed in U.S. Pat. Nos. 4,966,406 and 5,088,788, alter and degrade appearance of the automobile. U.S. Pat. No. 4,596,418 illustrates a cover linked to a storage pocket permanently mounted under the trunk lid. This arrangement takes up a lot of storage space of the trunk and gives little flexibility to removal and re-installing of the pocket when there is a need.

OBJECTS AND ADVANTAGES

Accordingly, the present invention has its objects to provide a simple, inexpensive and convenient means for protecting the automobile. Following are several advantages and-features of the present invention:

a) Installation, application and storage of the cover are rapid and effortless.

b) The cover is able to effectively protect the interior of automobile from damaging sun light, reduce the buildup of heat in passenger compartment and prevent frost on glass areas in cold weather.

c) The cover is light-weighted, compact in storage and easy to transport.

d) The cover requires minimal skills and low costs for fabrication and assembly.

e) The cover may have one size to fit automobiles of various sizes and styles.

f) The cover deters unauthorized removal from the automobile when it is installed.

These and other objects, features and advantages will be made more readily apparent from following detailed description of the preferred and other embodiments.

| Reference Numerals In The Drawings | |
|---|---|
| 11 | Cover |
| 12 | Elastic Cord |
| 13 | Handhold |
| 14 | Polymer Bar member |
| 15 | Loop |
| 16 | Cord |
| 17 | Semi-pliable metal hook |
| 18 | Storage pouch |
| 18a | Flap of Storage Pouch |
| 19 | Adjustable Belt |
| 20 | Elongated Strap |
| 21 | Elongated Strap |
| 22 | Elastic Strap Section |
| 23 | Adjusting Buckle |
| 24 | Belt Hook |
| 24a | Hanger of Belt Hook |
| 25a | Loop Fastener of Loop & Hook Fasteners |
| 25b | Hook Fastener of Hook & Loop Fasteners |
| 30 | Automobile |
| 31 | Side Mirror |
| 32 | Passenger Compartment |
| 33 | Engine Hood |
| 34 | Trunk Lid |
| 35 | Windshield |
| 50 | Tie-Down Strap |
| 51 | Roll-Up Sheet |
| 52 | Hook Fastener of Hook & Loop Fasteners on Roll-Up Sheet |
| 53 | Loop Fastener of Hook & Loop Fasteners on Roll-Up Sheet |
| 54 | Hook Fastener of Hook & Loop Fasteners on Tie-Down Strap |
| 55 | Suction Pad |

DESCRIPTION OF THE PREFERRED EMBODIMENT

Figure 1:
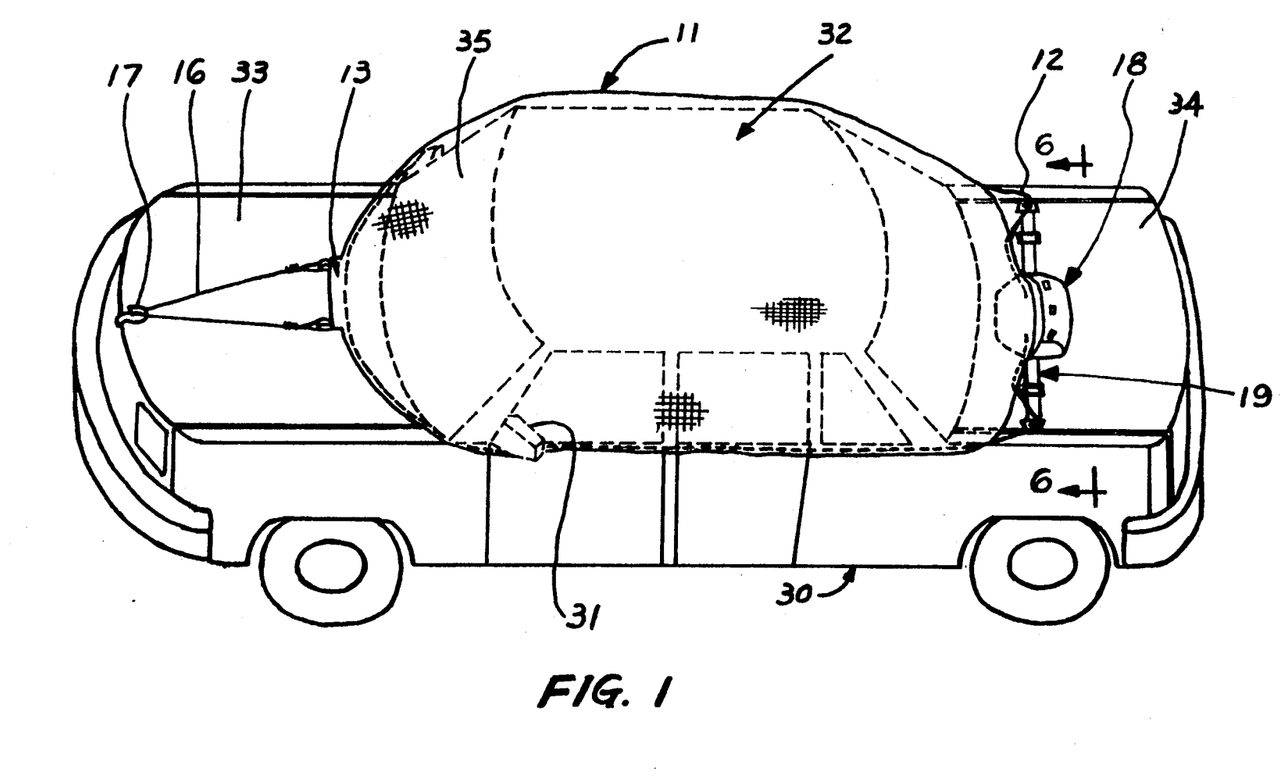
FIG. 1 is a perspective view of the preferred embodiment of the cover apparatus when applied to an automobile.

FIG. 1 shows the cover apparatus of the present invention being applied to an automobile 30. The cover apparatus covering passenger compartment 32 of the automobile 30 includes a cover 11 made of flexible material, such as fabric or polyester sheet, a first attachment means for securing the cover 11 to the front of the automobile 30, a storage pouch 18 for storing the cover 11 when not in use and a second attachment means for securing the cover 11 to the trunk lid 34 or the rear end of the automobile 30.

The cover 11 can be cut from a single sheet or be made by joining two symetric halves cut from smaller sheets. Referring to FIG. 2, 3, 4 and 5, a rectangular pocket is formed at first end of the cover 11 and a polymer bar member 14 is inserted in the pocket through an opening to constitute a rigid handhold 13 on the cover 11. Two loops 15 are attached to the handhold 13 for connecting the first attachment means to the cover 11. An elastic cord 12 is hemmed around edges of the cover 11 except at two immediate corners adjacent to the second end of the cover 11 which is directly opposite to the first end.

Figure 2:
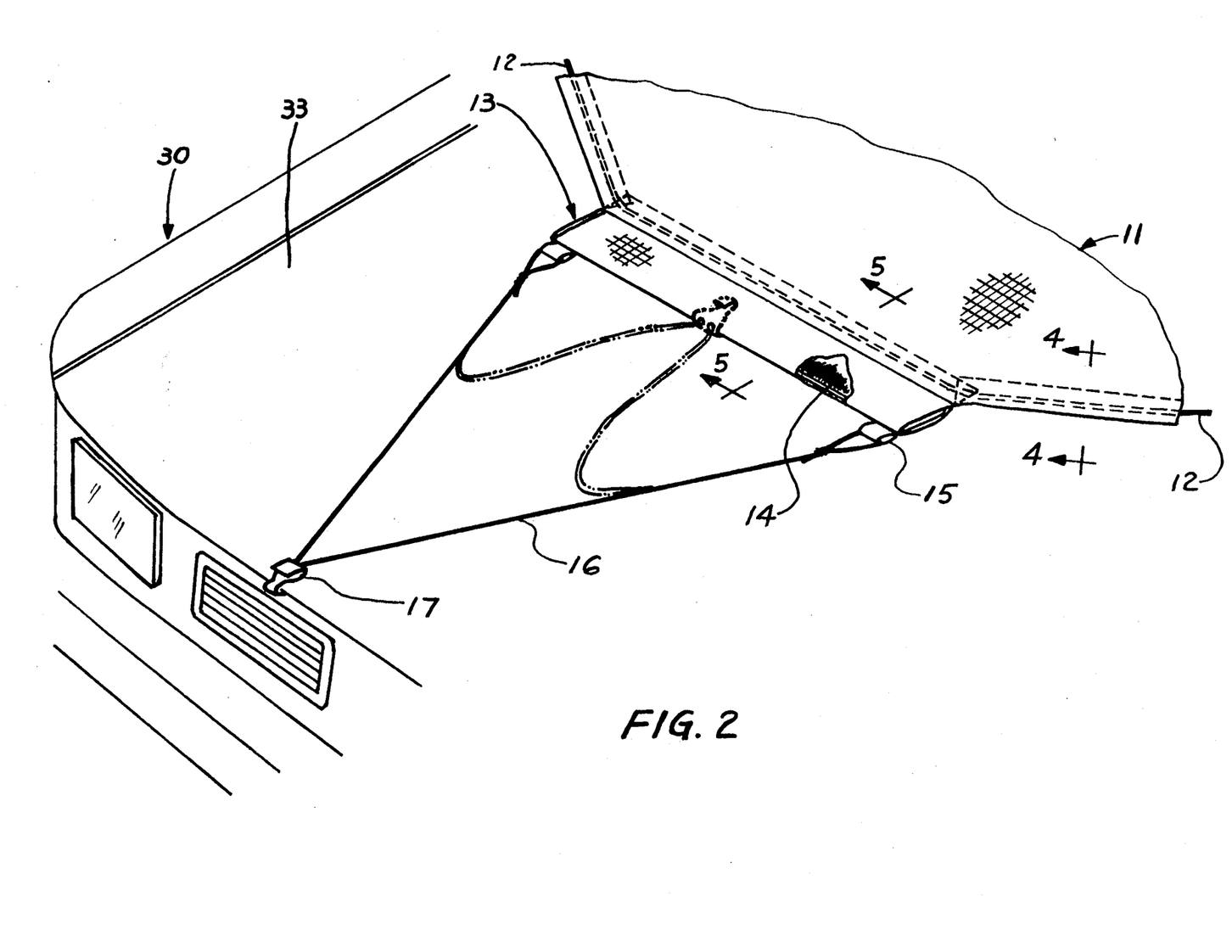
FIG. 2 is a perspective view showing the first attachment means securing one end of the cover to the front of an automobile.

The first attachment means comprises of a cord 16 and a semi-pliable metal hook 17 coated with soft polymer compound to prevent scratching exterior of the automobile 30. First end of the cord 16 is tied to one of the loops 15 while the second end is threaded through the metal hook 17 and tied to another loop 15 after proper length of the cord 16 is adjusted. The semipliable hook 17 is in S shape to enable the hook to snap on the handhold 13 when the cover apparatus is not in use.

Figure 3:
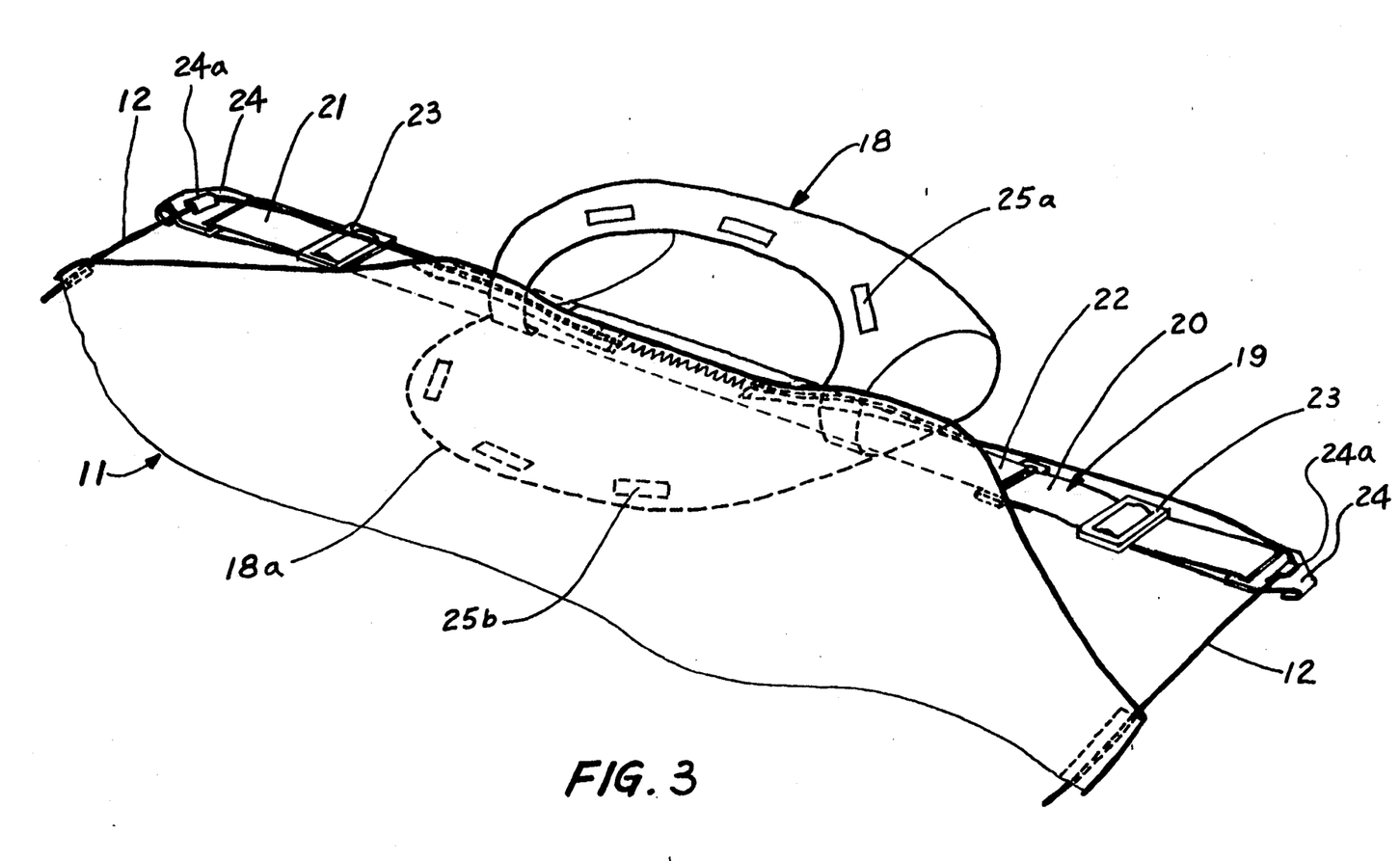
FIG. 3 is a perspective view showing details of the storage pouch and its connection to the cover.
Figure 4:
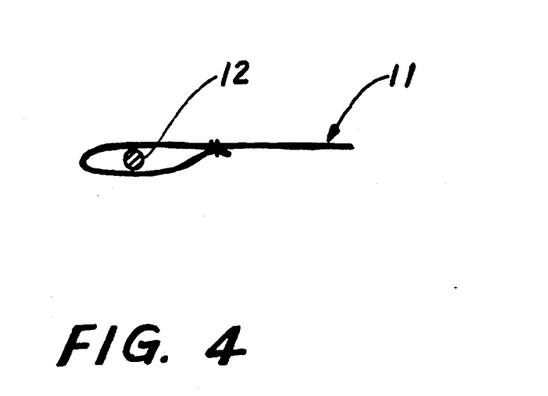
FIG. 4 is a cross-sectional view of the cover taken along the line of 4—4 in FIG. 2.
Figure 5:
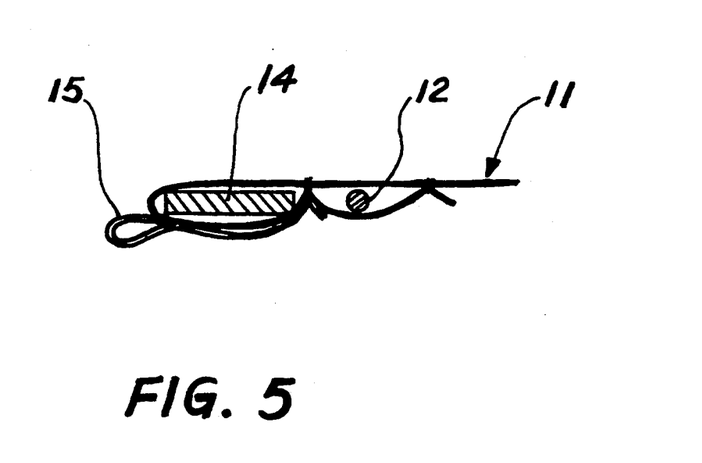
FIG. 5 is a cross-sectional view of the cover taken along the line of 5—5 in FIG. 2.

Referring to FIG. 3, the storage pouch 18 fixed to the second end of the cover 11 can be made of flexible material like synthetic leather or fabric. It has a flap 18a to cover an opening on a wider side. Loop fasteners 25a of hook and loop fasteners are attached to the rim of the flap 18a and matching hook fasteners 25b attached to corresponding locations on the pouch 18.

FIG. 3 also shows the second attachment means which comprises of an adjustable belt 19 formed by two elongated straps 20, 21, an elastic strap 22, two adjusting buckles 23 and two hooks 24 around which both ends of the belt 19 are wound respectively. An L-shaped hanger 24a is formed on outer flat surface of each hook 24. The hooks 24 fare coated with soft polymer compound to prevent scratching the body of the automobile 30.

Figure 6:
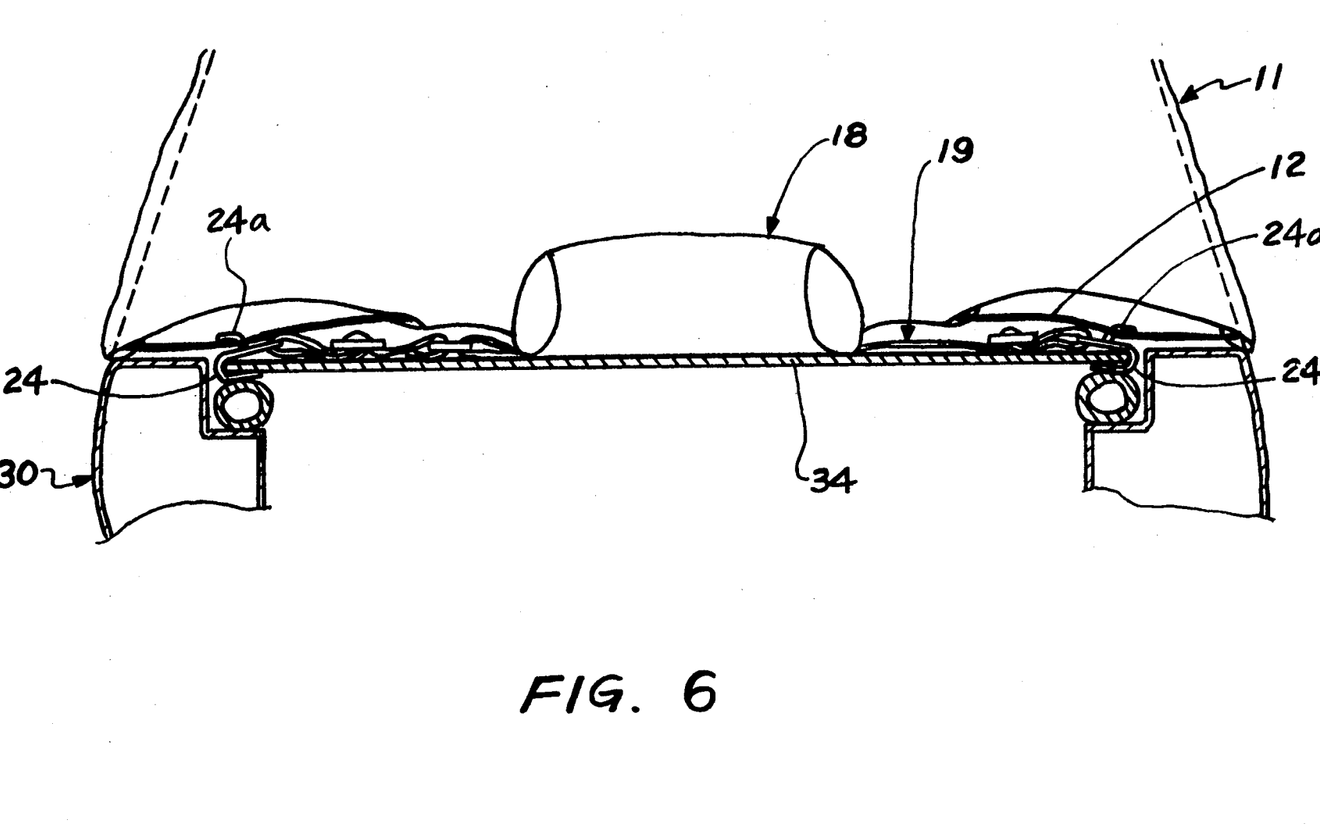
FIG. 6 is a cross-sectional view taken along the line of 6—6 in FIG. 1.

To install the cover apparatus, first unlock the trunk of the automobile 30 and keep the trunk lid 34 slightly open. Position the cover apparatus over the trunk lid 34 and secure the apparatus by engaging the hooks 24 to both longitudinal sides of the trunk lid 34. When installation is completed by closing the trunk lid 34, the flap of the storage pouch 18a should point toward the front of the automobile 30. FIG. 6 shows the apparatus can not be removed as long as the trunk lid 34 stay closed. Thus the second attachment means also serves to deter theft or unauthorized removal of the cover apparatus.

To deploy the cover 11, open the flap 18a and bring the cover 11 out of the pouch 18 by pulling the handhold 13 toward the front of the automobile 30 until it reaches a stop. Detach the metal hook 17 from the handhold 13 to secure the cover 11 to the engine hood 33 or any proper location in the front of the automobile 30. Bring down the cover 11 to cover side windows and have the cover restrained by side mirrors 31. Stretch the sections of the elastic cord 12 exposed near the second end of the cover 11 and have them held by the hangers 24a on the hooks 24. By doing so, the cover 11 is better secured to the rear portion of the automobile 30.

To retract the cover 11, first release the metal hook 17 from the front of the automobile 30. Place the metal hook 17 on the handhold 13 as is shown in FIG. 2. Bring the handhold 13 back in the storage pouch 18 before collecting the cover 11. Stuff the cover 11 into the pouch 18 and, then, close the flap 18a. The assembly can be left on the trunk lid 34 for the convenience of next use or be further dismantled from the trunk lid 34 and carried away with both ends of the belt 19 folded into the pouch 18.

DESCRIPTION OF THE OTHER EMBODIMENTS

Figure 7:
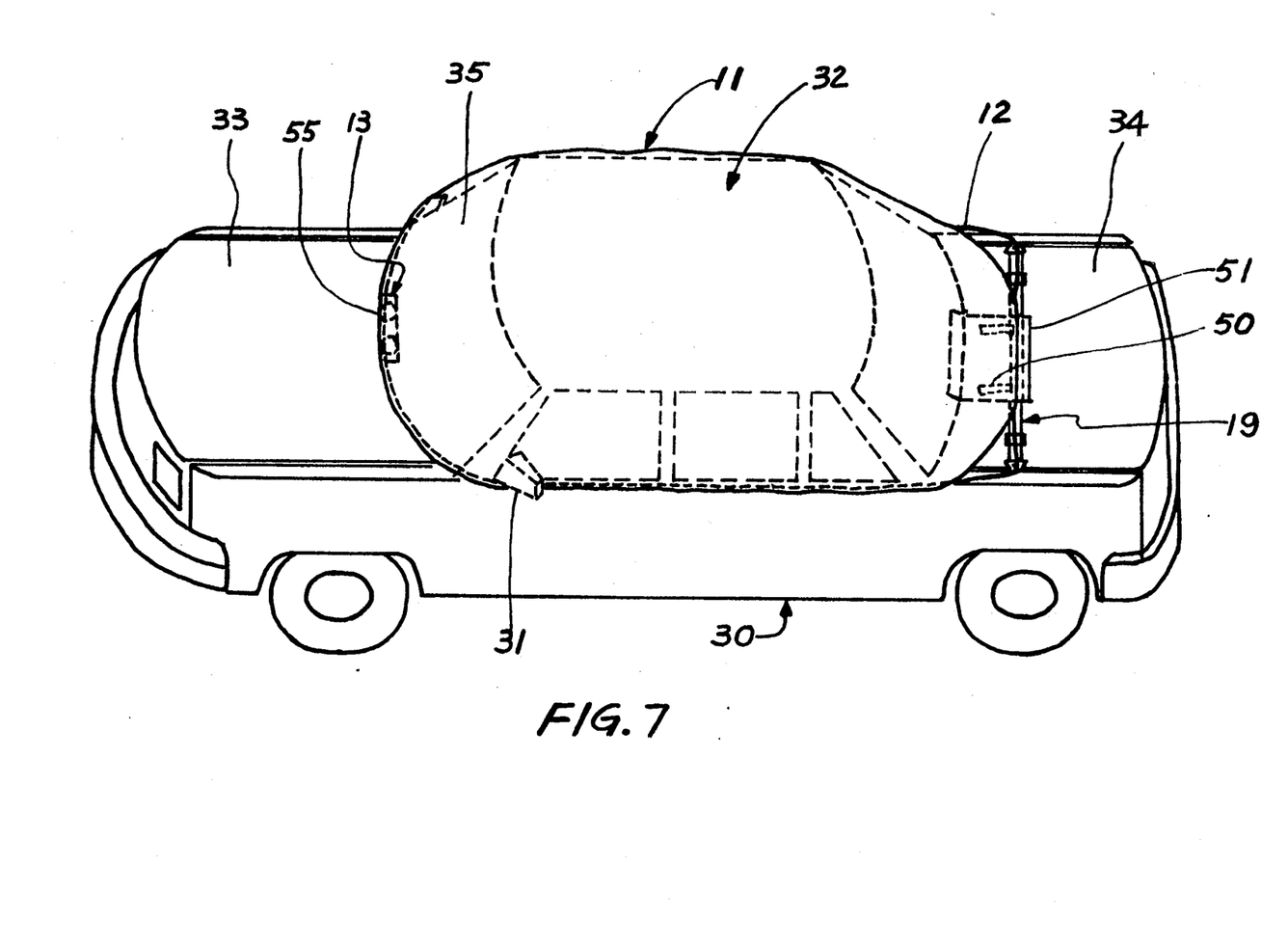
FIG. 7 is a perspective view of the second embodiment of the cover apparatus when applied to an automobile.

FIG. 7 shows a second embodiment of the invention. Suction pads 55 or devices of that nature replace the first attachment means. Suction pads 55 are attached beneath the handhold 13 on the underside of the cover 11. The suction pads 55 can be made as integrated/parts of the handhold 13. In this embodiment, the cover 11 conforms the shape of the automobile 30 or, specifically, the shape of the passenger compartment 32 closely so that the handhold 13 will rest at the bottom of the windshield 35 when the cover 11 is applied to the automobile 30. Loops 15 attached to the handhold 13 for connecting purpose are not needed in this embodiment.

Figure 8:
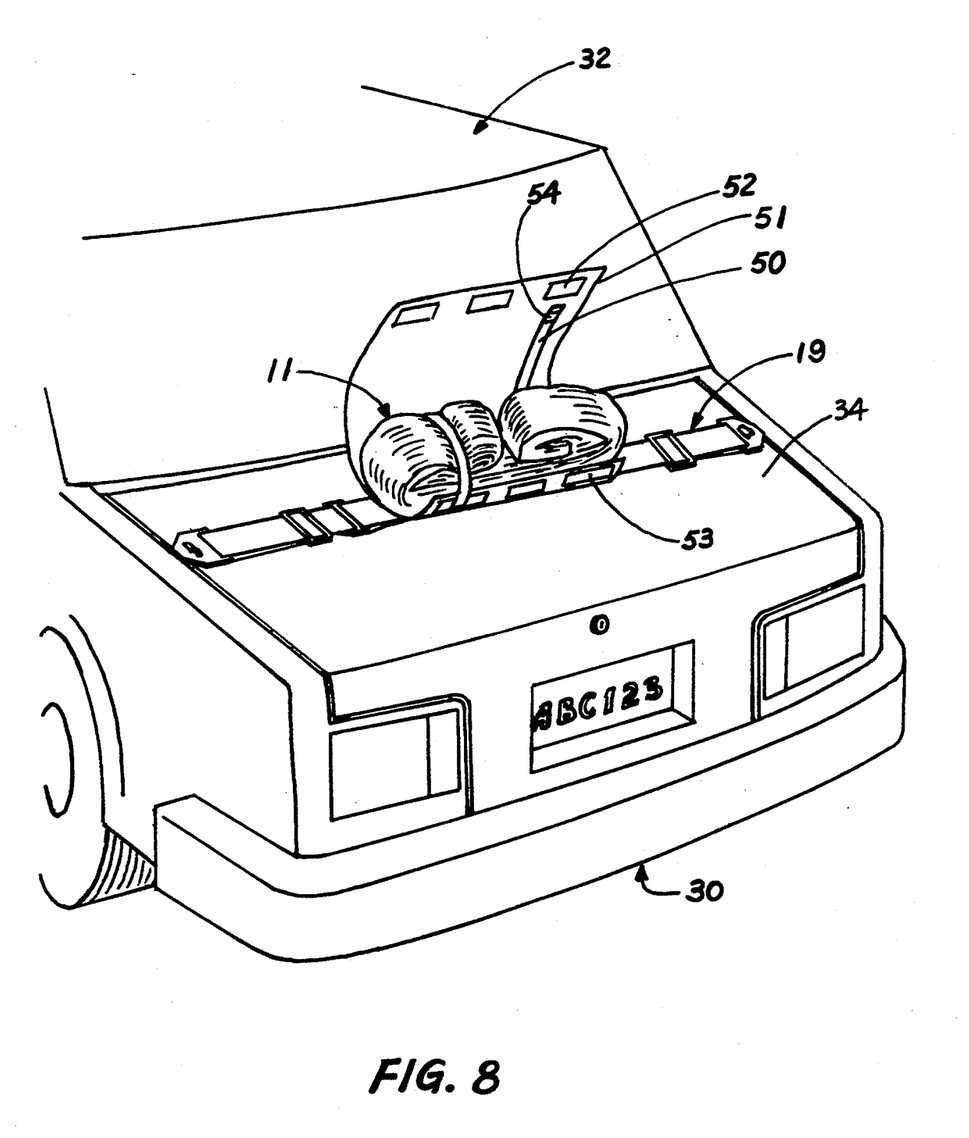
FIG. 8 is a perspective view showing the storage means of the second embodiment of the cover apparatus.

Referring to FIG. 8, the storage pouch 18 is replaced by a storage means comprising a roll-up sheet 51 and a pair of tie-down straps 50. The roll-up sheet 51, generally in rectangular shape, can be made of flexible material like fabric or synthetic leather. The roll-up sheet 51 is fixed to the belt 19 and divided by the belt 19 into a larger and a smaller rectangular section. Hook fasteners 52 of hook and loop fasteners are attached to the free end of the larger section to match loop fasteners 53 on the smaller section. The tie-down straps 50 attached to the roll-up sheet 51 at a distance apart along the belt length also have hook fasteners 54 on the free ends to match loop fasteners 53 on the smaller section of the roll-up sheet 51.

Procedures for installing and deploying the cover apparatus is the same as those for the embodiment of FIG. 1 except that the cover is secured to the windshield 35 by the suction pads 55, not anchored to the front of the automobile 30.

To retract and store the cover 11, first detach the suction pads 55 from the windshield 35 and bring the handhold 13 into the roll-up sheet 51, then, collect the cover 11 toward the roll-up sheet 51 by making it into a managerable roll. Fold the roll within the width of the roll-up sheet 51 along the length of the belt 19. Use the tie-down straps 50 to secure the folds inside the roll-up sheet 51. Wrap up the folds by making hook fasteners 52 and loop fasteners 53 on both ends of the roll-up sheet 51 meet. The assembly can be either left on the trunk lid 34 for next use or further dismantled from the automobile 30 for storing away.

The first and the second embodiment can be combined to form a best cover apparatus for an automobile. Although the descriptions above contain many specificities, these should not be construed as limiting the scope of the invention but as merely providing illustrations of the inventio. The scope of the invention should be determined by the appended claims and their legal equivalents rather than by the examples given.

I claim:

1. A cover apparatus for an automobile having a front portion and a rear portion, said cover apparatus comprising:
   a flexible sheet for covering at least a portion of said automobile, said sheet having a first end, a second end opposite to said first end, and elastic means that encircles a periphery of said sheet;
   first attachment means coupled to said first end of said sheet for securing said sheet to the front portion of said automobile;

storage means coupled to said second end for storing said sheet and said first attachment means; and second attachment means coupled to said storage means for securing said storage means and said sheet to the rear portion of said automobile, said second attachment means including a belt coupled to said storage means, said belt having a first belt end and a second belt end, said first belt end and said second belt end extending outward from said storage means in opposite directions, means coupled to said belt for tensing said belt when stretched;

adjusting means coupled to said belt for regulating length of said belt, and a pair of hooks coupled to said first belt end and said second belt end respectively, each of said hooks having a secondary hook for coupling said elastic means of said flexible sheet to said hooks.

2. A cover for covering passenger compartment of an automobile including a first portion and a second portion, said cover comprising:

a flexible sheet for covering said passenger compartment, said sheet having a first end, a second end opposite to said first end, and elastic means that encircles periphery of said sheet;

a rigid handhold formed on said first end;

attachment means having a semipliable hook and a cord, said cord coupling said semipliable hook to said handhold; and storage means for storing said sheet and said attachment means, said storage means having a pouch and a belt, said belt being fixed on said pouch for securing said pouch to said second portion, said belt having a first belt end and a second belt end, at least one length adjusting means for regulating length of said belt, a belt tension device for tensing said belt when stretched, and a pair of hooks coupled to said first belt end and said second belt end respectively, said hooks having at least one secondary hook for securing said elastic means to said hooks.

3. A cover apparatus for covering an automobile body comprising:

a cover for covering said automobile body, said cover being shaped to match said automobile body, said cover having elastic means and a first end;

storage means coupled to said first end for storing said cover; and attachment means coupled to said storage means for securing said storage means to said automobile body, said attachment means including a belt having an elastic section for tensing said belt when stretched, said belt having a first belt end and a second belt end, at least one adjusting means for regulating length of said belt, and a pair of hooks coupled to said first belt end and said second belt end respectively, said hooks having a secondary hook for securing said elastic means to said hooks.

4. A cover apparatus for covering a roof, a front window section, a rear window section, and side window sections of an automobile, said automobile having a front area and a rear area, said cover apparatus comprising:

a flexible sheet having at least a front section and a rear section;

attachment means formed on said rear section for securing said sheet on said automobile, said attachment means having a belt coupled to said storage means, said belt having a first belt end and a second belt end, said first belt end and said second belt end extending outward from said storage means along opposite directions, tension means formed on said belt for tensing said belt when stretched, adjusting means coupled to said belt for regulating length of said belt, and rear hook means coupled to said first belt end and said second belt end for securing said belt on the rear area of said automobile, said rear hook means includes a master hook coupled to the rear area of said automobile and a secondary hook formed on said master hook;

fastening means, said fastening means encircling a periphery of said sheet and being anchored to said secondary hook for securing said sheet on the roof, the front window section, the rear window section, and the side window sections of said automobile; and storage means formed on said rear section for storing said sheet.

* * * * *